(12) United States Patent
Johnson et al.

(10) Patent No.: US 12,438,854 B2
(45) Date of Patent: Oct. 7, 2025

(54) COMMUNICATING SECURELY BETWEEN NETWORK NODES

(71) Applicants: Jeffrey Jay Johnson, Logan, UT (US); Robert Foster Houghton, Pocatello, ID (US)

(72) Inventors: Jeffrey Jay Johnson, Logan, UT (US); Robert Foster Houghton, Pocatello, ID (US)

(73) Assignee: Utah State University, Logan, UT (US)

( * ) Notice: Subject to any disclaimer, the term of this patent is extended or adjusted under 35 U.S.C. 154(b) by 56 days.

(21) Appl. No.: 18/653,582

(22) Filed: May 2, 2024

(65) Prior Publication Data

US 2024/0372839 A1   Nov. 7, 2024

Related U.S. Application Data (60) Provisional application No. 63/463,828, filed on May 3, 2023.

(51) Int. Cl.
   *H04L 9/40*    (2022.01)
   *H04L 67/141*  (2022.01)
(52) U.S. Cl.
   CPC ........ *H04L 63/0428* (2013.01); *H04L 67/141* (2013.01)
(58) Field of Classification Search
   CPC .................. H04L 63/0428; H04L 67/141
   See application file for complete search history.

(56) References Cited

U.S. PATENT DOCUMENTS

| 11,647,003 B2 * | 5/2023 | Soman ................ H04L 63/0281 726/12 |
| 2006/0168136 A1 * | 7/2006 | Bethlehem ............ H04L 63/102 709/219 |
| 2007/0162861 A1 * | 7/2007 | Friedlander ............. G06F 21/83 715/741 |

(Continued)

OTHER PUBLICATIONS

J. Johnson, R. F. Houghton and A. Jensen, "Communication without Connection," 2022 Intermountain Engineering, Technology and Computing (IETC), Orem, UT, USA, 2022, pp. 1-3, doi: 10.1109/IETC54973.2022.9796946. Published May 2022 (Year: 2022).*

*Primary Examiner* — Chau Le (74) *Attorney, Agent, or Firm* — Kunzler Bean & Adamson (57) ABSTRACT

For communicating securely between network nodes, a method transmits a port knock sequence comprising ordered empty protocol packets from an origination node to a destination Internet Protocol (IP) address of a destination node. The port knock sequence encodes at least one vocabulary phrase. The method transmits the length of the at least one vocabulary phrase to first and second helper nodes. The method generates a corresponding substitute phrase for each at least one vocabulary phrase through communication between the first helper node and the second helper node. The method receives the corresponding substitute phrase for each at least one vocabulary phrase at the origination node and the destination node. The method generates a node nonce based on the at least one corresponding substitute phrase. The method securely communicates between the origination node and the destination node using the node nonce.

20 Claims, 10 Drawing Sheets

(56) References Cited

U.S. PATENT DOCUMENTS

| | | | |
|---|---|---|---|
| 2016/0094523 A1* | 3/2016 | Houghton | H04L 63/0428 |
| | | | 713/150 |
| 2017/0223045 A1* | 8/2017 | Claes | H04L 63/0209 |
| 2024/0380737 A1* | 11/2024 | Brown | H04L 63/0209 |
| 2025/0175341 A1* | 5/2025 | Stolbikov | H04L 9/3066 |

* cited by examiner

| IP Address 201 | Port Number 203 |
| | Port Number 203 |
| | ⋮ |
| | Port Number 203 |

⋮

| IP Address 201 | Port Number 203 |
| | Port Number 203 |
| | ⋮ |
| | Port Number 203 |

Base Symbol
119

Base Symbol
119

⋮

Base Symbol
119

| Vocabulary Phrase 113 | Substitute Phrase 115 |
|---|---|
| Vocabulary Phrase 113 | Substitute Phrase 115 |
| ⋮ | ⋮ |
| Vocabulary Phrase 113 | Substitute Phrase 115 |

FIG. 5C

COMMUNICATING SECURELY BETWEEN NETWORK NODES

CROSS-REFERENCE TO RELATED APPLICATIONS

This application claims priority to U.S. Provisional Patent Application No. 63/463,828 entitled "METHOD FOR COMMUNICATING THROUGH A FIREWALL USING ENCODED PORT KNOCKS" and filed on May 3, 2023, for Jeffrey Johnson, which is incorporated herein by reference.

BACKGROUND INFORMATION

The subject matter disclosed herein relates to secure communications between network nodes.

BRIEF DESCRIPTION

A method for communicating securely between network nodes is disclosed. The method transmits, by use of a processor, a port knock sequence comprising ordered empty protocol packets from an origination node to a destination Internet Protocol (IP) address of a destination node. The origination node comprises an origination IP address, the destination IP address comprises a destination port number, and the port knock sequence encodes at least one vocabulary phrase. The method transmits the length of the at least one vocabulary phrase from the origination node to a first helper node. The method transmits the length of the at least one vocabulary phrase from the destination node to a second helper node. The method generates a corresponding substitute phrase for each at least one vocabulary phrase through communication between the first helper node and the second helper node. The method receives the corresponding substitute phrase for each at least one vocabulary phrase from the first helper node at the origination node. In addition, the method receives the corresponding substitute phrase for each at least one vocabulary phrase from the second helper node at the destination node. The method generates a node nonce based on the at least one corresponding substitute phrase at the origination node and based on the at least one corresponding substitute phrase at the destination node. The method securely communicates between the origination node and the destination node using the node nonce. An apparatus and computer program product performing the method is also disclosed.

BRIEF DESCRIPTION OF DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise. The term "and/or" indicates embodiments of one or more of the listed elements, with "A and/or B" indicating embodiments of element A alone, element B alone, or elements A and B taken together.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

These features and advantages of the embodiments will become more fully apparent from the following description and appended claims or may be learned by the practice of embodiments as set forth hereinafter. As will be appreciated by one skilled in the art, aspects of the present invention may be embodied as a system, method, and/or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present invention may take the form of a computer program product embodied in one or more computer readable medium(s) having program code embodied thereon.

The computer readable medium may be a tangible computer readable storage medium storing the program code. The computer readable storage medium may be, for example, but not limited to, an electronic, magnetic, optical, electromagnetic, infrared, holographic, micromechanical, or semiconductor system, apparatus, or device, or any suitable combination of the foregoing.

More specific examples of the computer readable storage medium may include but are not limited to a portable computer diskette, a hard disk, a random access memory (RAM), a read-only memory (ROM), an erasable programmable read-only memory (EPROM or Flash memory), a portable compact disc read-only memory (CD-ROM), a digital versatile disc (DVD), an optical storage device, a magnetic storage device, a holographic storage medium, a micromechanical storage device, or any suitable combination of the foregoing. In the context of this document, a computer readable storage medium may be any tangible medium that can contain, and/or store program code for use by and/or in connection with an instruction execution system, apparatus, or device.

Program code for carrying out operations for aspects of the present invention may be written in any combination of one or more programming languages, including an object-oriented programming language such as MATLAB, Python, Ruby, R, Java, Java Script, Julia, Smalltalk, C++, C sharp, Lisp, Clojure, PHP or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). The computer program product may be shared, simultaneously serving multiple customers in a flexible, automated fashion.

The schematic flowchart diagrams and/or schematic block diagrams in the Figures illustrate the architecture, functionality, and operation of possible implementations. It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Although various arrow types and line types may be employed in the flowchart and/or block diagrams, they are understood not to limit the scope of the corresponding embodiments. Indeed, some arrows or other connectors may be used to indicate only an exemplary logical flow of the depicted embodiment.

The description of elements in each figure may refer to elements of proceeding figures. Like numbers refer to like elements in all figures, including alternate embodiments of like elements.

Figure 1A:
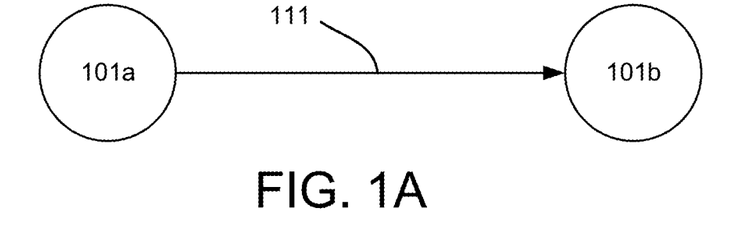
FIG. 1A is a schematic block diagram illustrating one embodiment of transmitting a port knock sequence.

FIG. 1A is a schematic block diagram illustrating one embodiment of transmitting a port knock sequence 111 between network nodes 101a-b. Two network nodes 101a-b are shown. In the depicted embodiment, an origination node 101a needs to communicate securely with a destination node 101b. The network nodes 101 are designated as origination node 101a and destination node 101b to illustrate a communication transaction. However, either network node 101 may function as origination node 101a or destination node 101b.

The network nodes 101 communicate by exchanging protocol packets. The protocol packets may be selected from the group consisting of Transmission Control Protocol (TCP) packets, User Datagram Protocol (UPD), Internet Control Message Protocol (ICMP) packets, QUIC packets, Datagram Congestion Control Protocol (DCCP) packets, and Stream Control Transmission Protocol (SCTP) packets. A network node 101 may transmit a protocol packet over a network comprising one or more of electronic connections, optical connections, wireless connections, and the like.

The origination node 101a comprises an origination IP address indicating the source of a protocol packet. The destination node 101b comprises a destination IP address specifying the destination of the protocol packet. The destination IP address comprises a destination port number. In one embodiment, the protocol packets may include information. In addition, a protocol packet may be empty, and only include address information such as the destination address and/or the origination address.

While the protocol packets may carry information between the network nodes 101, the protocol packets may be intercepted. Unless the information is encrypted, the information carried by the protocol packets is not secure. Unfortunately, the information can only be secure if a secret is shared between at least a start node 101 and an end node 101 for a communication. If no secret is shared, information cannot be encrypted and so cannot be securely communicated. The embodiments described herein securely establish a secret between network nodes, allowing the network nodes to securely communicate, as will be described hereafter.

A node 101 such as the destination node 101b may be protected by a firewall. The firewall is a software program that receives protocol packets. The firewall further records the protocol packets and screens the protocol packets. The firewall may screen the protocol packets for a port knock, a plurality of protocol packets directed to a specified sequence of destination port numbers. If the firewall recognizes the sequence of destination port numbers, the firewall may perform a function such as establishing a connection with a sending network node 101. The embodiments employ port knocking to establish secure communications between at least two nodes 101.

In the depicted embodiment, the origination node 101a transmits a port knock sequence 111 to a destination IP address 201 of a destination node 101b. The port knock sequence 111 may comprise ordered empty protocol packets. The port knock sequence 111 may comprise at least one vocabulary phrase. The at least one vocabulary phrase may be in a readable format such as Unicode. The port knock sequence 111 may encode the at least one vocabulary phrase as will be described hereafter. The port knock sequence 111 may encode the vocabulary phrase using a binary code with two possible values. Alternatively, the vocabulary phrase may be encoded with a trinary code and the like.

The at least one vocabulary phrase has a length such as a number of groups of symbols in all of the vocabulary phrases. A group of symbols is referred to hereafter as a word. Alternatively, the length may be a number of symbols in all of the vocabulary phrases. In addition, each vocabulary phrase may have a length. The length of the at least one vocabulary phrase may be the sum of the lengths of each vocabulary phrase. In one embodiment, the origination node 101a communicates an address and/or identify of a helper node to the destination node 101b.

Figure 1B:
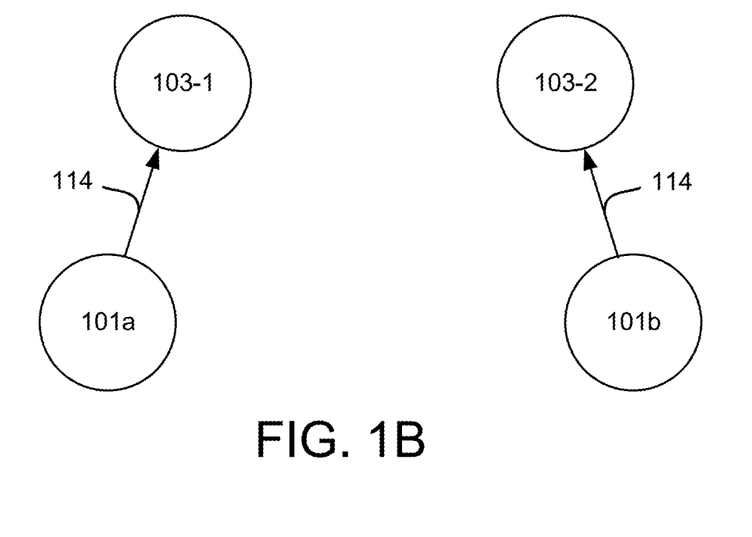
FIG. 1B is a schematic block diagram illustrating one embodiment of transmitting a length.

FIG. 1B is a schematic block diagram illustrating one embodiment of transmitting a length. In the depicted embodiment, a first helper node 103-1 is known to the origination node 101a and a second helper node 103-1 is known to the destination node 101b. The helper nodes 103 are network nodes 101 that generate substitute phrases in response to the lengths of the at least one vocabulary phrase to support generating a secret between the origination node 101a and the destination node 101b.

In one embodiment, the helper nodes 103 are each one of a large plurality of nodes that may be selected randomly by the origination node 101a and the destination node 101b. For example, in response to needing to establish secure communications with the destination node 101b and transmitting the port knock sequence 111, the origination node 101a may randomly select the first helper node 103-1. Similarly, in response to receiving the port knock sequence 111, the destination node 101b may randomly select the second helper node 103-2.

In an alternate embodiment, the first helper node 103-1 is assigned to a plurality of network nodes 101 including the origination node 101a. For example, the first helper node 103-1 may be assigned to all network nodes 101 of a given server, a given IP address, or the like. Similarly, the second helper node 103-2 may be assigned to a plurality of network nodes 101 including the destination node 101b.

The origination node 101a transmits the length 114 of the at least one vocabulary phrase to the first helper node 103-1. In addition, the destination node 101b transmits the length 114 of the at least one vocabulary phrase to the second helper node 103-2. In one embodiment, the destination node 101b transmits an address and/or identifier of the first helper node 103-1 to the second helper node 103-2. As a result, both the first helper node 103-1 and the second helper node 103-2 have the length 114 of the at least one vocabulary phrase. In addition, the second helper node 103-2 may have the address and/or identifier of the first helper node 103-1.

The length 114 may be communicated in a protocol packet. In addition to the length 114, the protocol packet may include additional identifying information such as the address of the first helper node 103-1, the identifier of the first helper node 103-1, a timestamp, the origination IP address, the destination IP address, and the like.

Figure 1C:
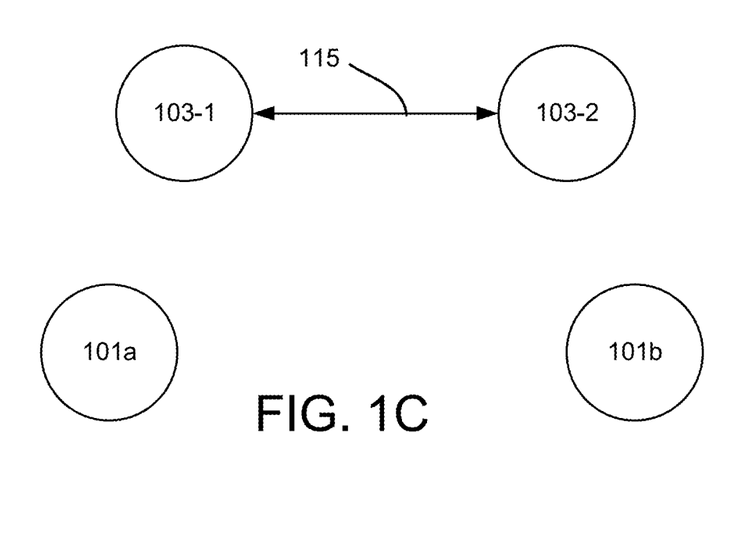
FIG. 1C is a schematic block diagram illustrating one embodiment of generating a corresponding substitute phrase.

FIG. 1C is a schematic block diagram illustrating one embodiment of generating a corresponding substitute phrase 115. The first helper node 103-1 and the second helper node 103-2 communicate with each other to generate a corresponding substitute phrase 115 for each at least one vocabulary phrase. In one embodiment, the substitute phrase 115 is only based on the length 114 of the vocabulary phrases. For example, if the length 114 is 27 words, the helper nodes 103 may generate a substitute phrase 115 with 27 words. Similarly, if the length 114 is 47 symbols, the helper nodes 103 may generate a substitute phrase 115 with 47 symbols.

The first helper node 103-1 and the second helper node 103-2 may identify each other based on the length 114, the address of the first helper node 103-1 and/or the identifier of the first helper node 103-1. In addition, the first helper node 103-1 and the second helper node 103-2 may identify each other based on the length 114 and other information such as the timestamp, the origination IP address, the destination IP address, and the like.

In one embodiment, the first helper node 103-1 generates the substitute phrase 115 and communicates the substitute phrase 115 to the second helper node 103-2. Alternatively, the second helper node 103-2 generates the substitute phrase 115 and communicates the substitute phrase 115 to the first helper node 103-1. In a certain embodiment, the first helper node 103-1 and the second helper node 103-2 collaboratively generate the substitute phrase 115.

Figure 1D:
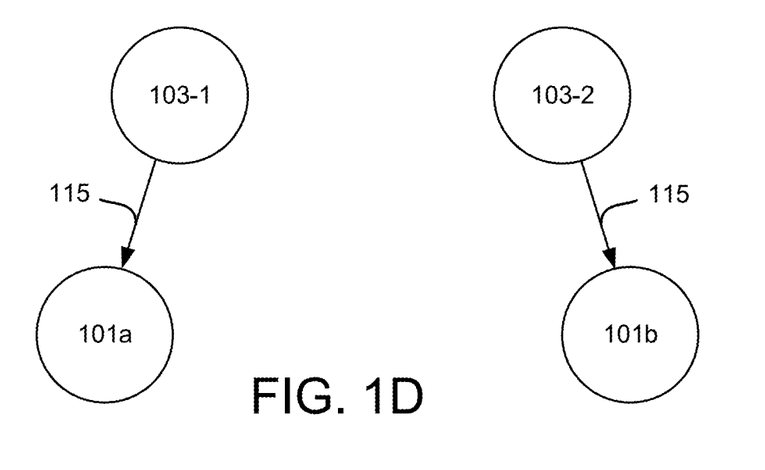
FIG. 1D is a schematic block diagram illustrating one embodiment of receiving a corresponding substitute phrase.

FIG. 1D is a schematic block diagram illustrating one embodiment of receiving a corresponding substitute phrase 115. The first helper node 103-1 communicates the substitute phrase 115 to the origination node 101a and the origination node 101a receives the substitute phrase 115 from the first helper node 103-1. In addition, the second helper node 103-2 communicates the substitute phrase 115 to the destination node 101b and the destination node 101b receives the substitute phrase 115 from the second helper node 103-2. As a result, both the origination node 101a and the destination node 101b have the vocabulary phrase and the substitute phrase 115.

Figure 1E:
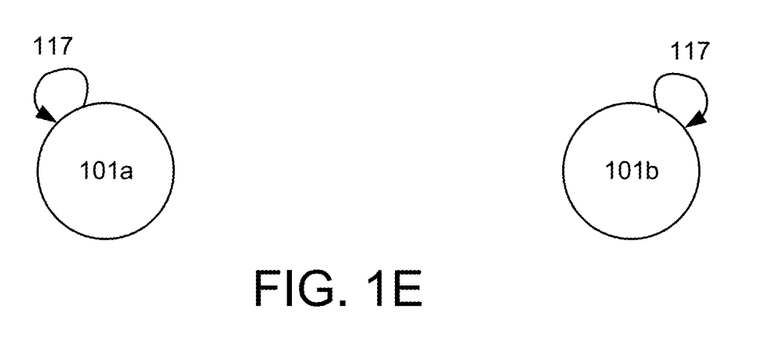
FIG. 1E is a schematic block diagram illustrating one embodiment of generating a node nonce.

FIG. 1E is a schematic block diagram illustrating one embodiment of generating a node nonce 117. In the depicted embodiment, the origination node 101a generates a node nonce 117 based on the at least one vocabulary phrase and the at least one corresponding substitute phrase 115. In addition, the destination node 101b generates the identical node nonce 117 based on the at least one vocabulary phrase and the at least one corresponding substitute phrase 115. The origination node 101a and the destination node 101b may each employ the same algorithm to generate the node nonce 117. The node nonce 117 is described hereafter in more detail. In one embodiment, a vocabulary phrase is paired with a corresponding substitute phrase 115 to form the node nonce 117.

Figure 1F:
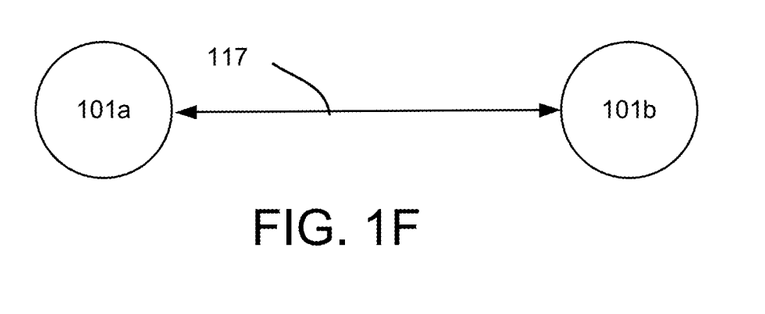
FIG. 1F is a schematic block diagram illustrating one embodiment of securely communicating.

FIG. 1F is a schematic block diagram illustrating one embodiment of secure communication. In the depicted embodiment, the origination node 101a and the destination node 101b securely communicate using the node nonce 117. The origination node 101a may encrypt information using the node nonce 117 and communicate the information to the destination node 101b, which decrypts the encrypted information using the identical node nonce 117. In addition, the destination node 101b may encrypt information using the node nonce 117 and communicate the encrypted information to the origination node 101a, which decrypts the encrypted information using the node nonce 117. As a result, the origination node 101a and the destination node 101b are able to securely communicate using the shared secret of the node nonce 117.

Figure 2A:
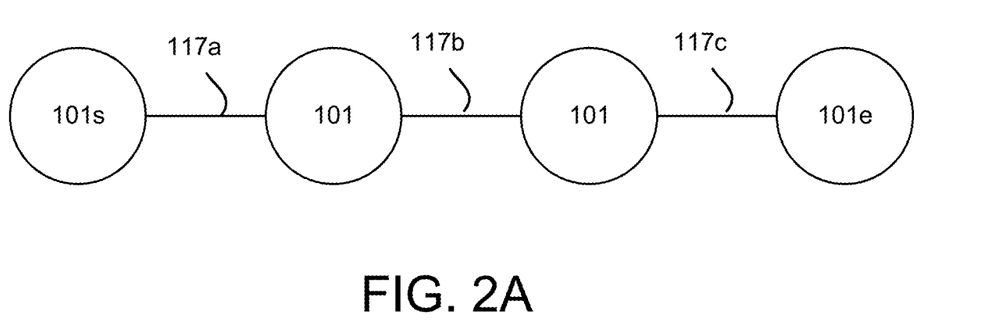
FIG. 2A is a schematic block diagram illustrating one embodiment of securely communicating between a start node and an end node.

FIG. 2A is a schematic block diagram illustrating one embodiment of securely communicating between a start node 101s and an end node 101e. In the depicted embodiment, four network nodes 101 are shown. However, any number of nodes may be employed. Pairs of network nodes 101 communicate with each other. Each pair of network nodes 101 may generate a unique node nonce 117a-c and securely communicate using the node nonce 117 for the pair as shown in FIGS. 1A-F. Information communicated between the start node 101s and the end node 101e may encrypted and decrypted using each node nonce 117a-c.

Figure 2B:
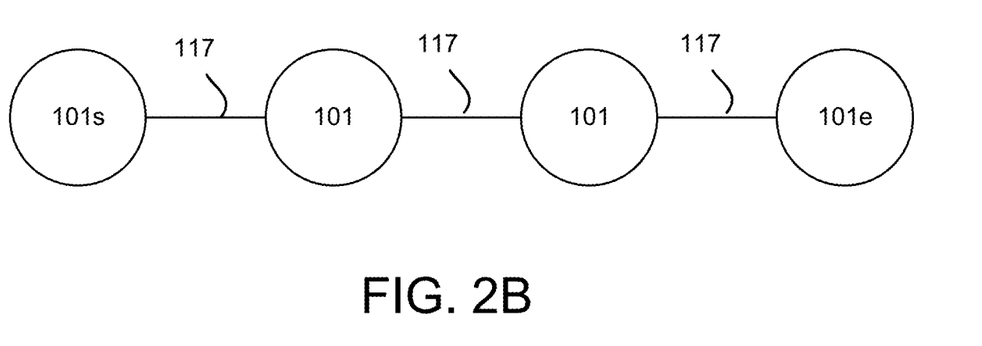
FIG. 2B is a schematic block diagram illustrating one alternate embodiment of securely communicating between a start node and an end node.

FIG. 2B is a schematic block diagram illustrating one alternate embodiment of securely communicating between a start node 101s and an end node 101e. In the depicted embodiment, four network nodes 101 are shown. However, any number of nodes may be employed. The start node 101s may function as the origination node 101a and the end node 101e may function as the destination node 101b. The start node 101s may transmit a port knock sequence 111 to a destination IP address 201 of the end node 101e via intervening network nodes 101. The start node 101s/origination node 101a and the end node 101e/destination node 101b generate a single shared node nonce 117 in FIGS. 1B-F and communicate securely using the node nonce 117.

Figure 2C:
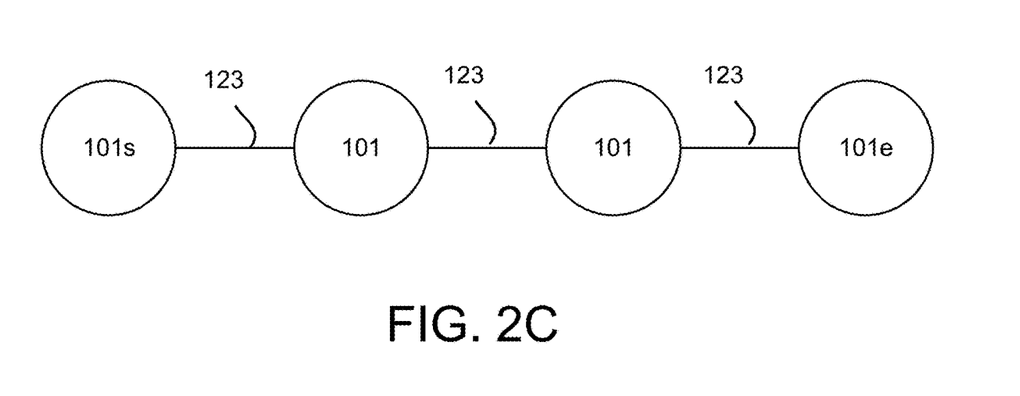
FIG. 2C is a schematic block diagram illustrating one alternate embodiment of securely communicating between a start node and an end node.

FIG. 2C is a schematic block diagram illustrating one embodiment of securely communicating between a start node 101s and an end node 101e. In the dedicated embodiment, the start node 101s and the end node 101e have established secure communications via at least one node nonce 117 as described in FIGS. 2A and 2B. Using the established secure communications, the start node 101s and the end node 101e may establish a path secret 123 and securely communicate using the path secret 123. For example, the start node 101s may generate the path secret 123 and securely communicate the path secret 123 to the end node 101e. Alternatively, the end node 101e may generate the path secret 123 and securely communicate the path secret 123 to the start node 101s. The start node 101s and the end node 101e may encrypt and decrypt all information communicated between each other using the path secret 123.

Figure 2D:
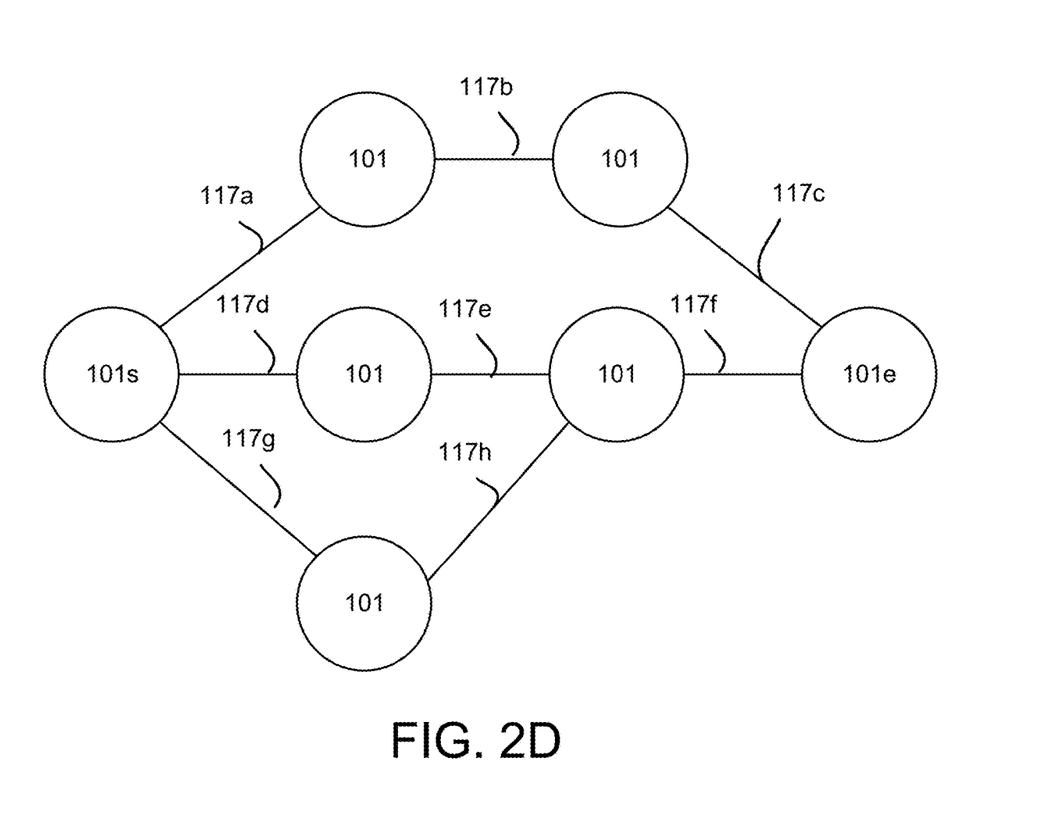
FIG. 2D is a schematic block diagram illustrating one alternate embodiment of securely communicating between a start node and an end node.

FIG. 2D is a schematic block diagram illustrating one embodiment of securely communicating between a start node 101s and an end node 101e. In the depicted embodiment, the start node 101s and the end node 101e may communicate over any of a plurality of paths of network nodes 101. Each pair of network nodes 101 may establish a unique node nonce 117. The start node 101s and the end node 101e may securely communicate using the plurality of unique node nonces 117 to encrypt and decrypt communications between each pair of network nodes 101.

Alternatively, the start node 101s and the end node 101e may employ the plurality of unique node nonces 117 to establish a path secret 123. The start node 101s and the end node 101e may then communicate securely using the path secret 123.

Figure 3A:
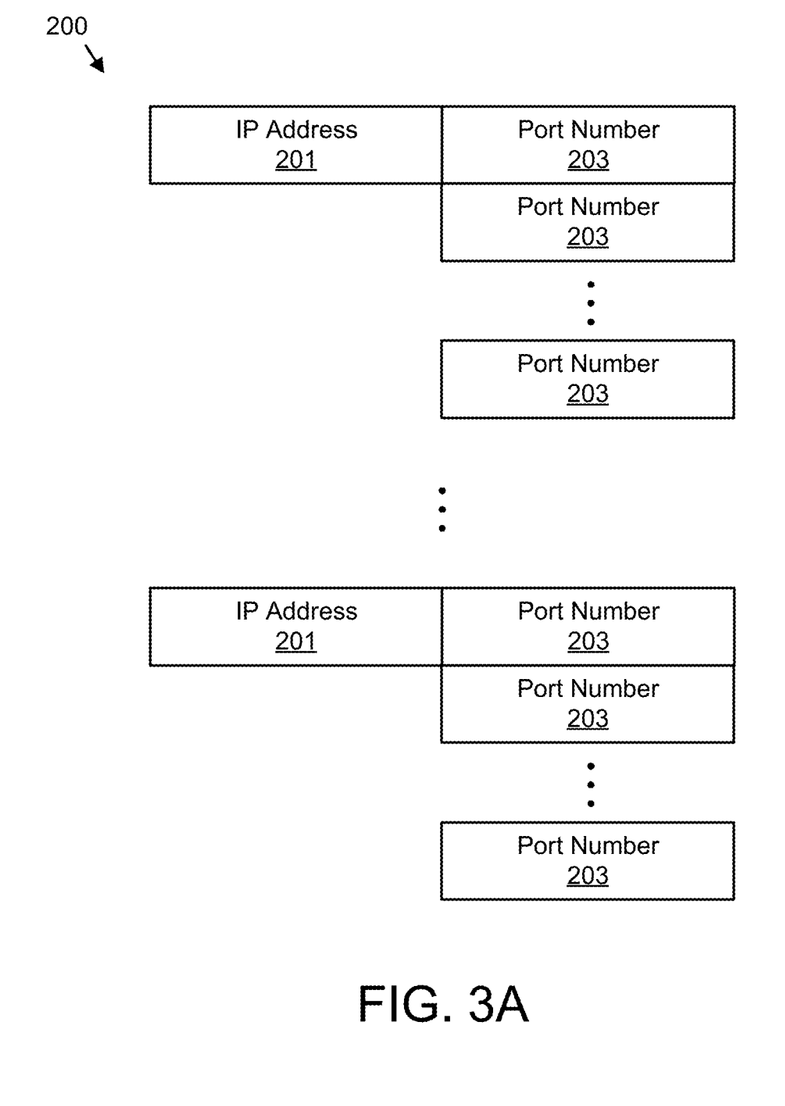
FIG. 3A is a schematic block diagram illustrating one embodiment of IP addresses.

FIG. 3A is a schematic block diagram illustrating one embodiment of IP addresses 201. A device such as a server, a router, a computer, a mobile device, and the like may have at least one IP address 201. In addition, each IP address 201 may have at least one port number 203. Protocol packets that are communicated to the device may be addressed to the IP address of the device. In addition, protocol packets may be addressed to an IP address 201 and a port number 203.

Figure 3B:
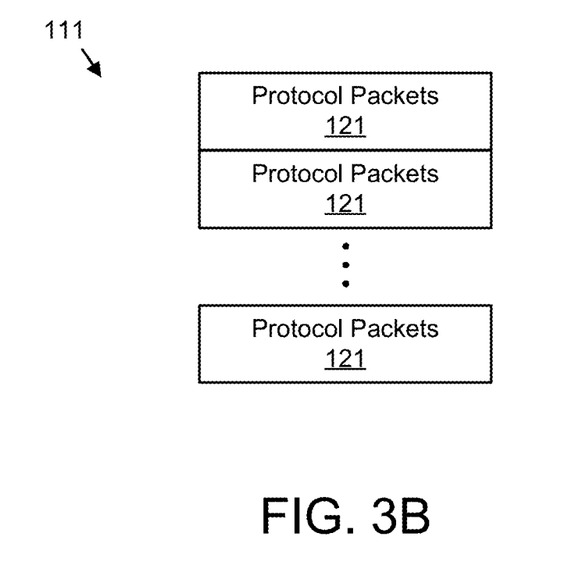
FIG. 3B is a schematic block diagram illustrating one embodiment of a port knock sequence.

FIG. 3B is a schematic block diagram illustrating one embodiment of a port knock sequence 111. In the depicted embodiment, the port knock sequence 111 comprises a plurality of protocol packets 121. The port knock sequence 111 may comprise empty protocol packets 121. The port knock sequence 111 may comprise ordered protocol packets 121.

The embodiments encode vocabulary phrases in the port knock sequence 111. Characteristics of the port knock sequence 111 may encode two or more base symbols. The base symbols may represent binary assertions and de-assertions. In addition, the base symbols may represent dots and dashes, binary zeros and ones, a pseudo alphabet, a partial alphabet, and the like. The base symbols may also encode punctuation such as spaces, dashes, returns, and the like.

In one embodiment, port numbers 203 of the protocol packets 121 in the port knock sequence 111 encode the base symbols. For example, a sequence of two protocol packets that skip two port numbers 203 may indicate a first base symbol, while skipping three port numbers 203 indicates a second base symbol and skipping 5 port numbers 203 indicates a third base symbol. Table 1 illustrates exemplary base symbols based on port numbers 203. Although two to four base symbols are shown, any number two or greater may be employed.

TABLE 1

| Base Symbol 0 | Base Symbol 1 | Base Symbol 2 | Base Symbol 3 |
|---|---|---|---|
| Skip 2 port numbers | Skip 3 port numbers | Skip 5 port numbers | |
| Skip 3 port numbers | Skip 5 port numbers | Skip 7 port numbers | |
| Skip 2 port numbers | Skip 3 port numbers | | |
| Skip 1 port number | Skip 2 port numbers | | |
| Skip 4 port numbers | Skip 8 port numbers | Skip 1 port number | |
| Skip 2 port numbers | Skip 3 port numbers | Skip 5 port numbers | Skip 7 port numbers |

Alternatively, other information in the protocol packet may encode the base symbols. For example, a pair of time stamps may be adjusted to indicate a base symbol. In addition, a base symbol may be encoded in a single protocol packet.

Figure 3C:
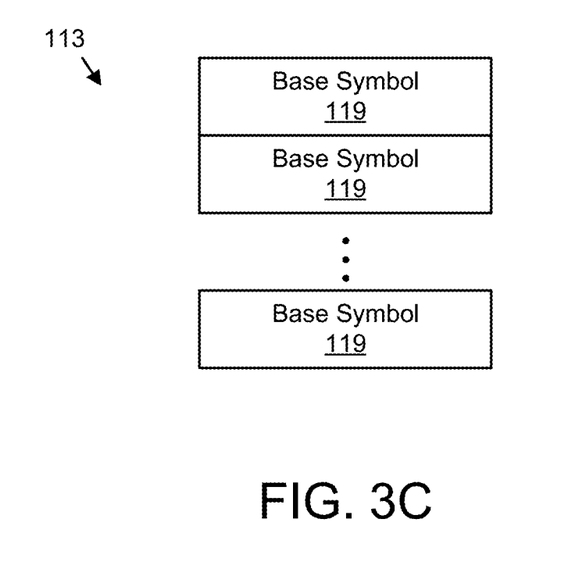
FIG. 3C is a schematic block diagram illustrating one embodiment of vocabulary phrases.

FIG. 3C is a schematic block diagram illustrating one embodiment of a vocabulary phrase 113. In the depicted embodiment, the vocabulary phrase 113 comprises a plurality of base symbols 119. Table 2 illustrates an example of a vocabulary phrases 113 wherein the base symbols 119 are more Morse code base symbols encoded by skips in port numbers from the first example in Table 1.

TABLE 2

| Port Number | Base Symbol 119 | Vocabulary Phrase 113 |
|---|---|---|
| 14525 | | |
| 14529 | dash | T |
| 14535 | space | |
| 14358 | dot | H |
| 14361 | dot | |
| 14364 | dot | |
| 14367 | dot | |
| 14373 | space | |
| 14376 | dot | E |
| 14382 | space | |

Each vocabulary phrase 113 has a length 114. The length 114 may be a number of base symbols 119. In addition, the length 114 may be a number of alphanumeric and/or numeric characters formed from the base symbols 119. In one embodiment, the length 114 is a number of words and/or numbers formed from the alphanumeric and/or numeric characters. A node 101 may store the vocabulary phrase 113 and the length 114 of the vocabulary phrase 113.

Figure 3D:
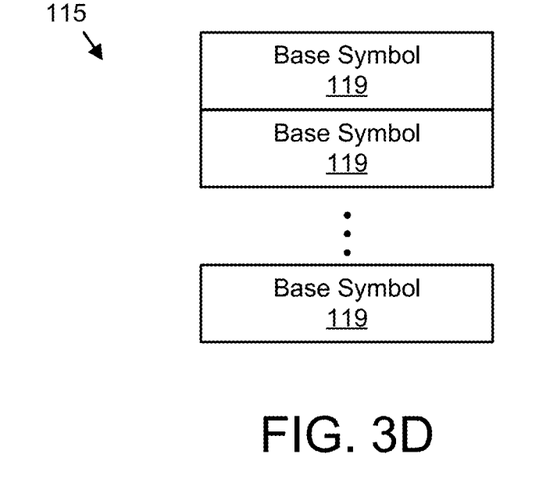
FIG. 3D is a schematic block diagram illustrating one embodiment of substitute phrases.

FIG. 3D is a schematic block diagram illustrating one embodiment of a substitute phrase 115. In the depicted embodiment, a substitute phrase 115 comprises a plurality of base symbols 119. The substitute phrase 115 has the same length 114 as the corresponding vocabulary phrase 113. The substitute phrase 115 may have the same number of words as the corresponding vocabulary phrase 113. In a certain embodiment, the substitute phrase 113 has the same number of base symbols 119 as the corresponding vocabulary phrase 113. The base symbols 119 may be the same base symbols 119 used for the vocabulary phrases 113. Alternatively, different base symbols 119 may be employed for the vocabulary phrases 113 and the substitute phrases 115.

Figure 3E:
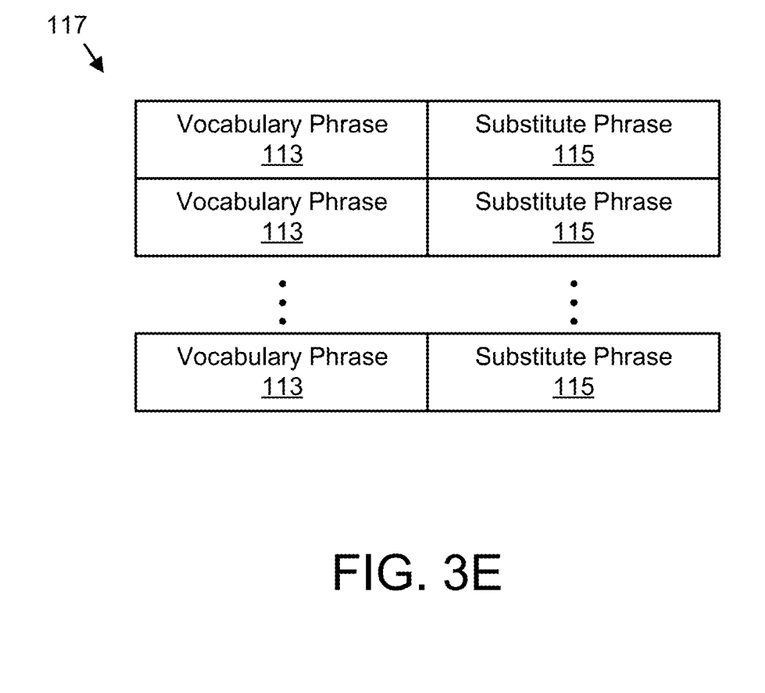
FIG. 3E is a schematic block diagram illustrating one embodiment of vocabulary phrases and corresponding substitute phrases.

FIG. 3E is a schematic block diagram illustrating one embodiment of vocabulary phrases 113 and corresponding substitute phrases 115. The vocabulary phrases 113 and substitute phrases 115 form a node nonce 117. In the depicted embodiment, there is a substitute phrase 115 corresponding to each vocabulary phrase 113.

The node nonce 117 enables secure communications between network nodes 101. In one embodiment, if the vocabulary phrase 113 is encountered in a protocol packet, the corresponding substitute phrase 115 is substituted for the vocabulary phrase 113. Alternatively, if the substitute phrase 115 is encountered in the protocol packet, the vocabulary phrase 113 is substituted for the substitute phrase 115. The node nonce 117 is used to communicate securely between the origination node 101a and the destination node 101b by encrypting messages.

Figure 4:
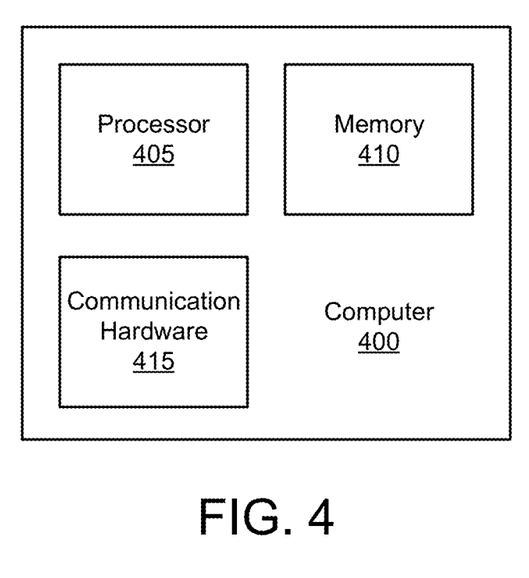
FIG. 4 is a schematic block diagram illustrating one embodiment of a computer.

FIG. 4 is a schematic block diagram illustrating one embodiment of a computer 400. At least one computer 400 may be embodied in each node 101 and helper node 103. In the depicted embodiment, the computer 400 includes a processor 405, a memory 410, and communication hardware 415. The memory 410 may store code and data. The processor 405 may execute the code and process the data. The communication hardware 415 may communicate with other devices such as network nodes 101 and helper nodes 103.

Figure 5A:
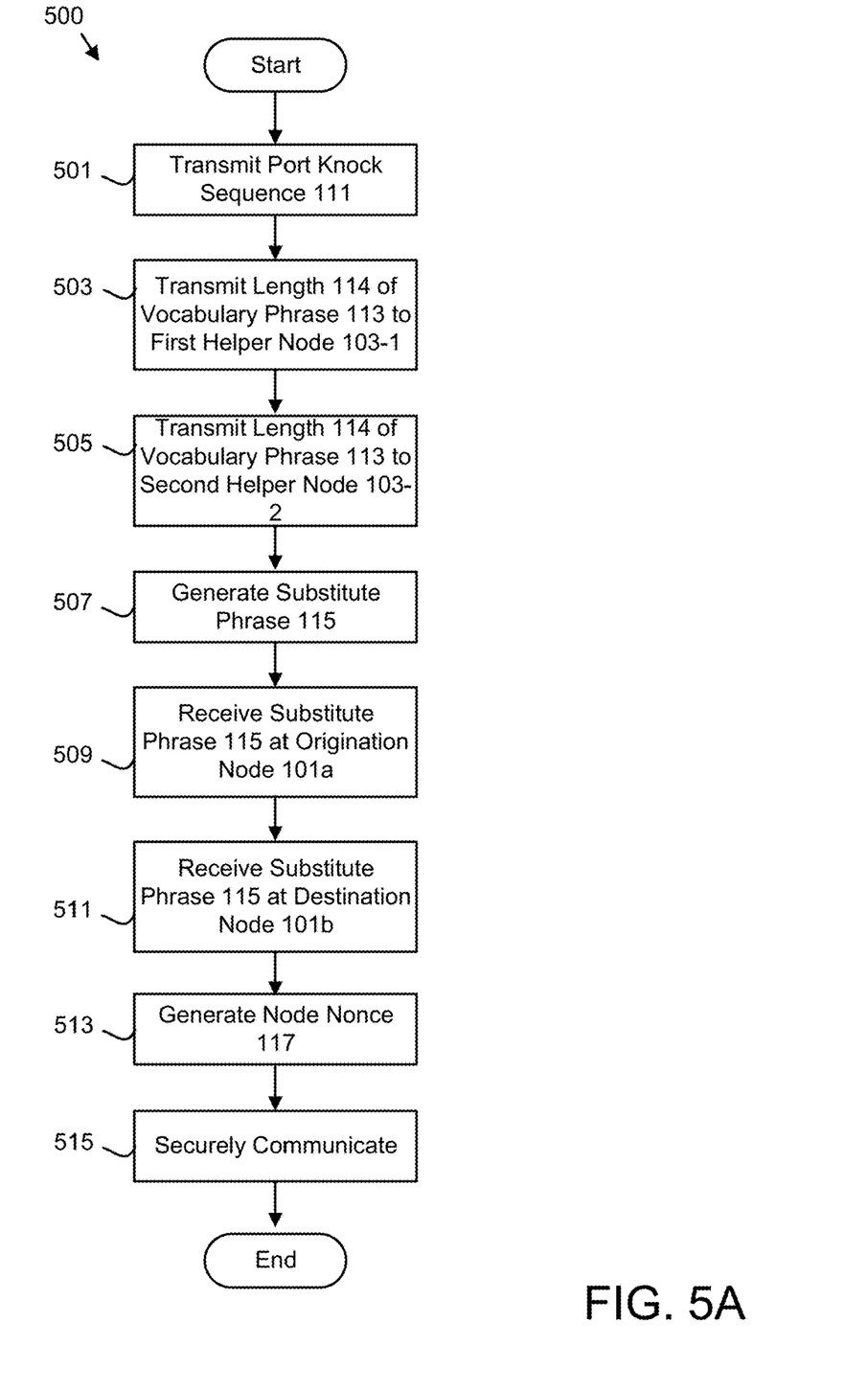
FIG. 5A is a schematic flow chart diagram illustrating one embodiment of an inter-node secure communication method.

FIG. 5A is a schematic flow chart diagram illustrating one embodiment of an inter-node secure communication method 500. The method 500 enables two nodes 101 to establish a shared secret and communicate securely using the shared secret. The method 500 may be performed by a plurality of nodes 101, computers 400, and/or processors 405.

The method 500 starts and transmits 501 a port knock sequence 111 comprising ordered empty protocol packets 121 from an origination node 101a to a destination IP address 201 of a destination node 101b. The port knock sequence 111 encodes at least one vocabulary phrase 113. The origination node 101a and the destination node 101b may communicate over a network. However, the destination IP address 201 may not be accessible to the origination node 101a.

The method 500 transmits 503 the length 114 of the at least one vocabulary phrase 113 from the origination node 101a to a first helper node 103-1. In an alternate embodiment, the origination node 101a transmits 503 the at least one vocabulary phrase 113 to the first helper node 103-1.

The method 500 further transmits 505 the length 114 of the at least one vocabulary phrase 113 from the destination node 101b to a second helper node 103-2. In an alternate embodiment, the destination node 101b transmits 505 the at least one vocabulary phrase 113 to the second helper node 103-2.

The method 500 generates 507 a corresponding substitute phrase 115 for each at least one vocabulary phrase 113 through communication between the first helper node 103-1 and the second helper node 103-2. In one embodiment, the first helper node 103-1 and the second helper node 103-2 employ the length 114, a time stamp, the origination IP address 201, the destination IP address 201, at least one destination port number 203 such as a first destination port number 203 of the port knock sequence 111, and the like to identify each other. The first helper node 103-1 may further generate 507 the substitute phrase 115 and communicate the substitute phrase 115 to the second helper node 103-2. Alternatively, the second helper node 103-2 may generate 507 substitute phrase 115 and communicate the substitute phrase 103-2 to the first helper node 103-1. In a certain embodiment, the first helper node 103-1 and the second helper node 103-2 collaboratively generate 507 the substitute phrase 115.

Although both the first helper node 103-1 and the second helper node 103-2 have the substitute phrase 115, neither the first helper node 103-1 nor the second helper node 103-2 have the at least one vocabulary phrase 113. As a result, the first helper node 103-1 and the second helper node 103-2 cannot generate the node nonce 117. Thus, communications between the origination node 101a and the destination node 101b remain secure, enabling secure and efficient communication.

In one alternate embodiment, the origination node 101a communicates the at least one vocabulary phrase 113 to the first helper node 103-1 and the destination node 101b communicates the at least one vocabulary phrase 113 to the second helper node 103-2. The method 500 generates 507 the substitute phrase 115 using the at least one vocabulary phrase 113.

The method 500 receives 509 the corresponding substitute phrase 115 for each at least one vocabulary phrase 113 from the first helper node 103-1 at the origination node 101a. The first helper node 103-1 may communicate the substitute phrase 115 back to the origination node 101a in response to receiving the length 114 from the origination node 101a.

The method 500 receives 511 the corresponding substitute phrase 115 for each at least one vocabulary phrase 113 from the second helper node 103-2 at the destination node 101b. The second helper node 103-2 may communicate the substitute phrase 115 back to the destination node 101b in response to receiving the length 114 from the destination node 101b.

The method 500 generates 513 the node nonce 117 based on the at least one corresponding substitute phrase 115 at the origination node 101a and based on the at least one corresponding substitute phrase 115 at the destination node 101b. In one embodiment, the vocabulary phrases 113 and substitute phrases 115 are paired as shown in FIG. 3E.

The method 500 securely communicates 515 between the origination node 101a and the destination node 101b using the node nonce 117 and the method 500 ends. In one embodiment, the origination node 101a or destination node 101b encrypts information using the node nonce 117 and communicates the encrypted information to the other node 101 which decrypts the information using the node nonce 117. For example, a substitute phrase 115 may replace the corresponding vocabulary phrase 113 to encrypt a message. After the message is received, the vocabulary phrase 113 replaces the corresponding substitute phrase 115 to decrypt the message.

In one embodiment, a new node nonce 117 is regenerated from a new at least one vocabulary phrase 113 and corresponding new substitute phrase 115. For example, the origination node 101a may send a new vocabulary phrase 113 encoded in a new port knock sequence 111 to the destination node 101b. The method 500 may generate a new node nonce 117 from the new vocabulary phrase 113 as described above. As a result, the origination node 101a/destination node 101b pair periodically regenerate a new node nonce 117 for increased security. In one embodiment, the new node nonce 117 is regenerated after each specified number of communications between the origination node 101a and the destination node 101b. In a certain embodiment, the specified number of communications is one.

In one embodiment, the origination node 101a and the destination node 101b generate a tunnel transformation from one or more node nonces 117. The origination node 101a and the destination node 101b may securely communicate using the tunnel transformation. In addition, the origination node 101a and the destination node 101b may dynamically generate and modify the tunnel transformation in response to new node nonces 117. As a result, secure communications are maintained even over long communications.

In one embodiment, the origination node 101a and the destination node 101b employ the node nonce 117 to encrypt lingual units of a message. The lingual units are then decrypted using the node nonce 117.

Figure 5B:
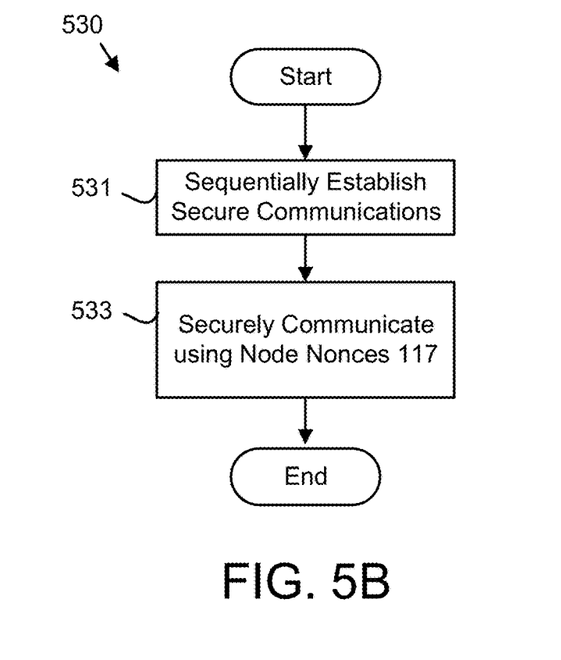
FIG. 5B is a schematic flow chart diagram illustrating one embodiment of a secure communication method.

FIG. 5B is a schematic flow chart diagram illustrating one embodiment of a secure communication method 530. The method 530 enables two nodes 101 that are separated by other nodes 101 to establish the node nonces 117 and communicate securely using the node nonces 117. The method 530 may be performed by a plurality of network nodes 101, computers 400, and/or processors 405.

The method 530 starts and sequentially establishes 531 secure communications for a plurality of nodes 101 comprising origination nodes 101a and corresponding destination nodes 101b between a start node 101s and an end node 101e. For example, the start node 101s may act as an origination node 101a and establish secure communications with at least one destination node 101b using a node nonce 117 as shown in FIGS. 2A, 2B, and 2D. The at least one destination node 101b may then act as an origination node 101a and establish secure communications with at least one other destination node 101b using the node nonce 117 and so on until secure communications are established with the end node 101e.

The method 530 securely communicates 533 using the node nonces 117. The start node 101s and end node 101e may securely communicate as communication between each origination node 101a/destination node 101b pair is encrypted using the node nonce 117 for the pair.

Figure 5C:
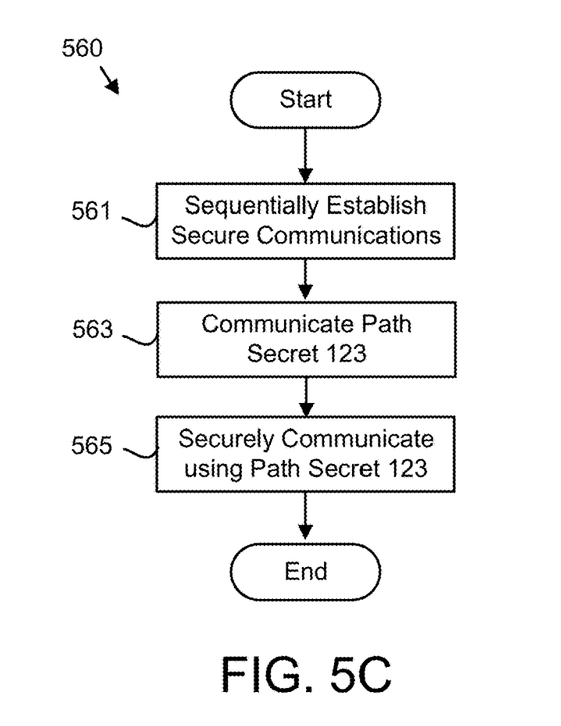
FIG. 5C is a schematic flow chart diagram illustrating one alternate embodiment of a secure communication method.

FIG. 5C is a schematic flow chart diagram illustrating one alternate embodiment of a secure communication method 560. The method 560 enables two nodes 101 that are separated by other nodes 101 to establish a shared secret and communicate securely using the shared secret. The method 560 may be performed by a plurality of network nodes 101, computers 400, and/or processors 405.

The method 560 starts and sequentially establishes 561 secure communications for a plurality of nodes 101 comprising origination nodes 101a and corresponding destination nodes 101b between a start node 101s and end node 101e. For example, the start node 101s may act as an origination node 101a and establish secure communications with at least one destination node 101b using a node nonce 117 as shown in FIGS. 2A, 2B, and 2D. The at least one destination node 101b may then act as an origination node 101a and establish secure communications with at least one destination node 101b using the node nonce 117 and so on until secure communications are established with the end node 101e.

The method 560 may communicate 563 a path secret 123 between the start node 101s and the end node 101e using the node nonces 117 for each origination node 101a and destination node 101b pair. The node nonces 117 are used to encrypt and decrypt the path secret 123 for each origination node 101a/destination node 101b pair.

The method 560 securely communicates 565 using the path secret 123. The start node 101s and end node 101e may securely communicate as messages communicated between each origination node 101a/destination node 101b pair is encrypted using the path secret 123 and later decrypted using the path secret 123.

This description uses examples to disclose the invention and also to enable any person skilled in the art to practice the invention, including making and using any devices or systems and performing any incorporated methods. The patentable scope of the invention is defined by the claims and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A method comprising:
   transmitting, by use of a processor, a port knock sequence comprising ordered empty protocol packets from an origination node to a destination Internet Protocol (IP) address of a destination node, wherein the origination node comprises an origination IP address, the destination IP address comprises a destination port number, and the port knock sequence encodes at least one vocabulary phrase;
   transmitting the length of the at least one vocabulary phrase from the origination node to a first helper node;
   transmitting the length of the at least one vocabulary phrase from the destination node to a second helper node;
   generating a corresponding substitute phrase for each at least one vocabulary phrase through communication between the first helper node and the second helper node;
   receiving the corresponding substitute phrase for each at least one vocabulary phrase from the first helper node at the origination node;
   receiving the corresponding substitute phrase for each at least one vocabulary phrase from the second helper node at the destination node;
   generating a node nonce based on the at least one corresponding substitute phrase at the origination node and based on the at least one corresponding substitute phrase at the destination node; and
   securely communicating between the origination node and the destination node using the node nonce.

2. The method of claim 1, the method further comprising:
   sequentially establishing secure communications for a plurality of nodes comprising origination nodes and corresponding destination nodes between a start node and an end node; and
   securely communicating between the start node and the end node using the node nonce for each origination node and destination node pair.

3. The method of claim 2, the method further comprising:
   communicating a path secret between the start node and the end node using the node nonce for each origination node and destination node pair; and
   securely communicating between the start node and the end node using the path secret.

4. The method of claim 1, wherein the node nonce comprises the at least one vocabulary phrase and the corresponding substitute phrase.

5. The method of claim 1, wherein the node nonce is generated from the at least one vocabulary phrase and the corresponding substitute phrase.

6. The method of claim 1, wherein a new node nonce is regenerated from a new at least one vocabulary phrase and corresponding new substitute phrase.

7. The method of claim 6, wherein the new node nonce is regenerated after each specified number of communications between the origination node and the destination node.

8. The method of claim 7, wherein the specified number of communications is one.

9. The method of claim 1, the destination port number is protected by a firewall.

10. The method of claim 1, wherein the protocol packets are selected from the group consisting of Transmission Control Protocol (TCP) packets, User Datagram Protocol (UPD), Internet Control Message Protocol (ICMP) packets, QUIC packets, Datagram Congestion Control Protocol (DCCP) packets, and Stream Control Transmission Protocol (SCTP) packets.

11. The method of claim 1, wherein the destination IP address is not accessible to the origination node.

12. An apparatus comprising:
a processor executing code stored by a memory to perform:
transmitting a port knock sequence comprising ordered empty protocol packets from an origination node to a destination Internet Protocol (IP) address of a destination node, wherein the origination node comprises an origination IP address, the destination IP address comprises a destination port number, and the port knock sequence encodes at least one vocabulary phrase;
transmitting the length of the at least one vocabulary phrase from the origination node to a first helper node;
transmitting the length of the at least one vocabulary phrase from the destination node to a second helper node;
generating a corresponding substitute phrase for each at least one vocabulary phrase through communication between the first helper node and the second helper node;
receiving the corresponding substitute phrase for each at least one vocabulary phrase from the first helper node at the origination node;
receiving the corresponding substitute phrase for each at least one vocabulary phrase from the second helper node at the destination node;
generating a node nonce based on the at least one corresponding substitute phrase at the origination node and based on the at least one corresponding substitute phrase at the destination node; and
securely communicating between the origination node and the destination node using the node nonce.

13. The apparatus of claim 12, the processor further:
sequentially establishing secure communications for a plurality of nodes comprising origination nodes and corresponding destination nodes between a start node and an end node; and
securely communicating between the start node and the end node using the node nonce for each origination node and destination node pair.

14. The apparatus of claim 13, the processor further:
communicating a path secret between the start node and the end node using the node nonce for each origination node and destination node pair; and
securely communicating between the start node and the end node using the path secret.

15. The apparatus of claim 12, wherein the node nonce comprises the at least one vocabulary phrase and the corresponding substitute phrase.

16. The apparatus of claim 12, wherein the node nonce is generated from the at least one vocabulary phrase and the corresponding substitute phrase.

17. The apparatus of claim 12, wherein a new node nonce is regenerated from a new at least one vocabulary phrase and corresponding new substitute phrase.

18. A computer program product comprising a non-transitory computer readable storage medium storing code executable by processor to perform:
transmitting a port knock sequence comprising ordered empty protocol packets from an origination node to a destination Internet Protocol (IP) address of a destination node, wherein the origination node comprises an origination IP address, the destination IP address comprises a destination port number, and the port knock sequence encodes at least one vocabulary phrase;
transmitting the length of the at least one vocabulary phrase from the origination node to a first helper node;
transmitting the length of the at least one vocabulary phrase from the destination node to a second helper node;
generating a corresponding substitute phrase for each at least one vocabulary phrase through communication between the first helper node and the second helper node;
receiving the corresponding substitute phrase for each at least one vocabulary phrase from the first helper node at the origination node;
receiving the corresponding substitute phrase for each at least one vocabulary phrase from the second helper node at the destination node;
generating a node nonce based on the at least one corresponding substitute phrase at the origination node and based on the at least one corresponding substitute phrase at the destination node; and
securely communicating between the origination node and the destination node using the node nonce.

19. The computer program product of claim 18, the processor further:
sequentially establishing secure communications for a plurality of nodes comprising origination nodes and corresponding destination nodes between a start node and an end node; and
securely communicating between the start node and the end node using the node nonce for each origination node and destination node pair.

20. The computer program product of claim 19, the processor further:
communicating a path secret between the start node and the end node using the node nonce for each origination node and destination node pair; and
securely communicating between the start node and the end node using the path secret.

* * * * *